United States Patent [19]

Aoki et al.

[11] Patent Number: 4,749,392
[45] Date of Patent: Jun. 7, 1988

[54] DEHUMIDIFYING MATERIAL

[75] Inventors: Yoshio Aoki, Koga; Masatoshi Saito, Tokyo, both of Japan

[73] Assignee: Kaken Pharmaceutical Co., Ltd., Tokyo, Japan

[21] Appl. No.: 937,288

[22] Filed: Dec. 3, 1986

[30] Foreign Application Priority Data

Dec. 3, 1985 [JP] Japan .................. 60-271937

[51] Int. Cl.⁴ .............................. B01D 53/04
[52] U.S. Cl. ........................ 55/387; 55/388; 55/513; 55/518
[58] Field of Search .............. 55/316, 387–389, 55/513, 515

[56] References Cited

U.S. PATENT DOCUMENTS

| | | | |
|---|---|---|---|
| 2,214,925 | 9/1940 | Guthrie | 55/387 |
| 2,578,324 | 12/1951 | Southwick, Jr. | 55/387 |
| 2,638,179 | 5/1953 | Yard | 55/387 |
| 3,343,897 | 9/1967 | Keller | |
| 3,568,416 | 3/1971 | Staunton | 55/316 X |
| 3,854,912 | 12/1974 | Terrel et al. | 55/316 X |
| 3,990,872 | 11/1976 | Cullen | 55/515 X |
| 4,224,366 | 9/1980 | McCabe, Jr. | 55/316 X |
| 4,383,376 | 5/1983 | Numamoto et al. | 34/9 |

FOREIGN PATENT DOCUMENTS

| | | | |
|---|---|---|---|
| 705291 | 4/1968 | Belgium . | |
| 2020622 | 11/1971 | Fed. Rep. of Germany . | |
| 2712433 | 10/1977 | Fed. Rep. of Germany | 55/387 |
| 3119999 | 12/1982 | Fed. Rep. of Germany . | |
| 1371450 | 7/1964 | France | 55/515 |
| 119418 | 9/1980 | Japan | 55/389 |
| 20222 | 2/1983 | Japan | 55/387 |
| 20289 | 4/1983 | Japan | 55/387 |
| 45346 | 10/1983 | Japan | 55/515 |
| 199020 | 11/1983 | Japan | 55/388 |
| 147615 | 8/1984 | Japan | 55/316 |
| 1160398 | 8/1969 | United Kingdom . | |
| 1376888 | 12/1974 | United Kingdom | 55/316 |
| 2063095 | 6/1981 | United Kingdom | 55/387 |

Primary Examiner—Robert Spitzer
Attorney, Agent, or Firm—Scrivener and Clarke

[57] ABSTRACT

A moisture absorbent is sealed between an elastic material and a moisture-permeable film to thereby provide a dehumidifying material having an elastic layer or bed therein. The dehumidifying material may be used in the fields of packing articles such as precision machines and dehydrated food and of dehumidification of beds, cushions, seat covers, lockers and the like.

14 Claims, 3 Drawing Sheets

DEHUMIDIFYING MATERIAL

BACKGROUND OF THE INVENTION

The present invention relates to a dehumidifying material for use in packing articles such as precision machines and dehydrated food which are easily damaged by moisture and for use as bed mats capable of absorbing moisture to ensure a comfortable sleep, and may also be used as dehumidifying panels in the construction of houses and so on.

Generally, electronic computers, various precision measurement instruments, precision machines, tea, rice cakes and the like which are to be completely free from moisture are sealingly packed together with desiccating agents with damp-proofing packing material.

Such measure for dehumidification necessitates two kinds of materials, i.e., desiccating agent and damp-proofing packing material. As a result, especially when a small-sized article is packed together with a desiccating agent, the packed article resulting package becomes voluminous excessively large due to the volume of the desiccating agent.

Large-sized precision machines to be exported are not wholly dehumidified by desiccating agents disposed at various positions around the machines and are difficult to sealingly pack with damp-proofing packing material. Thus, safety of commercial articles shipped to various countries in the world under various weather conditions cannot be completely guaranteed. When the contents must be protected from damage due to impacts, they are packed with a shock-absorbing material which increases the size of the packages.

Incorporation of a desiccating agent in a packing operation itself is disadvantageous in that the agent may be inadvertently omitted. Further there is the danger that the agent may be mistakenly eaten by children, especially in the case of packed food.

In addition, there have been no effective countermeasures in the art against a problem of bedridden patients' beds of Japanese mats becoming moldy after prolonged use or against a problem of a seat in an automotive vehicle or the like becoming unpleasantly dampish after one has sat on the seat for a long time.

Some embodiments of the present invention will be described in detail with reference to the accompanying drawings.

DETAILED DESCRIPTION OF THE PREFERRED EMBODIMENTS

Figure 1:
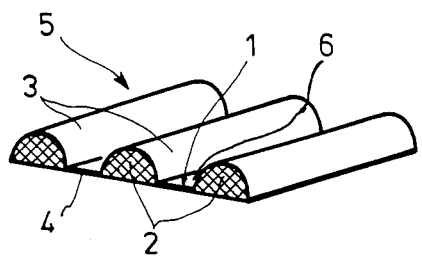
FIG. 1 is a broken perspective of a first embodiment of a dehumidifying material in accordance with the present invention.

FIG. 1 shows a first embodiment of the present invention in which reference numeral 1 denotes a flexible material such as plastic sheet, metal foil, water-proof paper, rubber sheet or water-proof cloth. The flexible material 1 has one major surface formed with grooves 3 convex upwardly in the drawing and spaced apart from each other. A moisture-permeable film 4 made of a moisture-permeable material is securely attached to the flexible material 1 with the grooves 3 being filled with a moisture absorbent 2, thereby providing a dehumidifying material 5.

As to the moisture absorbent 2, silica gel, activated alumina, calcium oxide and the like which are known as desiccating agents may be used singly or in combinations. Furthermore, deliquescence inorganic salt such as calcium chloride, magnesium chloride, aluminum chloride, lithium chloride, calcium bromide, zinc chloride, phosphorus pentoxide and the like may be used singly. Alternatively, such inorganic salt may be mixed with water-holding substance and/or hygroscopically hardenable substances, so that when absorbing moisture, the mixture does not deliquesce, but is hardened or solidified.

The term "water-holding substance" herein refers to a substance which has water retentivity and does not deliquesce and are not hardened by absorbing moisture. It may be an inorganic substance such as kalion, quartz sand, lime stone, bentonite, silica gel, sepiolite or zeolite, a natural substance such as starch, carboxymethylcellulose, sodium aliginate, carrageenan, cotton, cloth, paper or pulps; or porous, fiber-like, cloth- or sponge-like plastic such as acrylic acid vinyl alcohol copolymer, polyacrylnitrile hydrolysate, sodium acrylate acrylamide copolymer, starch graft polymer. The substance itself may have a capability of absorbing moisture.

The term "hygroscopically hardenable substance" herein refers to a substance which is hardened when absorbing moisture or water. It may be a hydraulic inorganic salt such as calcium silicate or calcium aluminate; hydraulic cement such as portland cement or alumina cement; hydraulic lime stone, hydraulic setting refractory or gypsum.

These deliquescence inorganic salt, water-holding substance and hygroscopically hardenable substance are preferably in the form of minute powder, fine powder, coarse powder, granule or particle and may be mixed at any ratios. In practice, the deliquescence inorganic salt is 10–50 parts, preferably 20–40 parts in weight; the water-holding substance is 5–50 parts, preferably 10–40 parts in weight; and the hygroscopically hardenable substance is 15–80 parts, preferably 20–70 parts in weight.

If required, a mold-proof agent such as bromocinnamaldehyde aldehyde may be added to the moisture absorbent 2 for attainment of mold-proofing in addition to drying.

If required, a deodorant agent such as activated carbon may be added to the moisture absorbent 2 for attainment of deodoration in addition to drying.

The moisture-permeable film 4 permits free passage of moisture therethrough, but must prevent passage of powder. It may be paper, cloth, nonwoven cloth and an inorganic or organic film such as a cellophane film, a collodione film, a denitric collodione film, a gel cellophane film, a perchment film, a polyvinyl alcohol film, a bacteria cellulose film, a fat film, a silicon film, a rubber film, a polybutadiene film, an ethylcellulose film, an ethylene vinyl acetate copolymer film, a PEG bisphenol A copolymer film, a low-density polyethylene film, a polystyrene film, a nitrocellulose film, a polycarbonate film, a polypropylene film, a triacetylcellulose film, a bridged polystyrene film, a diacetylcellulose film, a polyvinyl acetate film, a rubber hydrochloride film, a nylon film, a Teflon ® film, a polyacrylnitrile film, a polyvinylidene chloride film, a cellulose acetate film, a cellulose acetate propionate film, a cellulose acetate butyrate film or the like. When a deliquescence inorganic salt is singly used as the moisture absorbent 2, one of the above-described inorganic and organic films which permits free passage of moisture but does not permit free passage of powder and deliquescent liquid is used.

When the dehumidifying material 5 prepared in the manner described above is used as a dehumidifying packing material, it is cut off into a desired size at a portion which is not filled with the moisture absorbent 2 and is packed with an article such as a precision machine in such a manner that the moisture-permeable film 4 faces inside. Furthermore, if required, the package is sealed by heat sealing means or the like.

Thereafter the article packed with the dehumidifying material 5 is put into an outer packing box such as a corrugated cardboard box together with or without packing which is molded from foamed polystyrol.

Setting aside dehumidifying capability required by the article packed, use of a moisture-impermeable substance as the flexible material 1 prevents ventilation between the inside and the outside.

Moisture in the air inside the dehumidifying material 5 freely passes through the moisture-permeable film 4 and is absorbed by the moisture absorbent. When the moisture absorbent is composed of a deliquescence inorganic salt, its deliquesces; when the moisture absorbent consists of a deliquescence inorganic salt added with a water-holding substance and a hygroscopically hardenable substance, the deliquescent liquid is retained by the water-holding substance while reacting with the hygroscopically hardenable substance which is thereby hardened or solidified.

The moisture absorbent 2 is distributed and sealed almost over the whole surface of the dehumidifying material 5, so that the moisture absorbing area is considerably wide so that a quick and strong dehumidification effect can be attained.

A space between the adjacent grooves 3 filled with the moisture absorbent 2 serves as an elastic layer or bed 6 for absorbing any impact exerted from the outside of the outer box.

Figure 2:
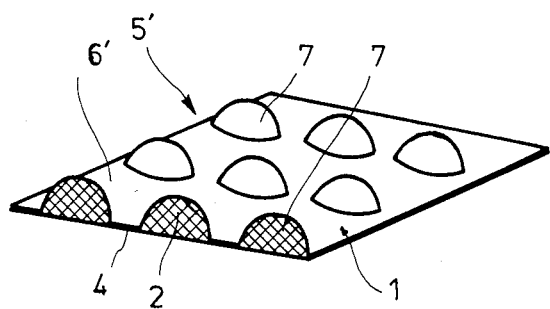
FIG. 2 is a broken perspective of a second embodiment of the present invention.

FIG. 2 shows a second embodiment of the present invention which is substantially similar in construction to the first embodiment described above. Instead of the grooves 3, the moisture absorbent 2 is filled into each of a plurality of recesses 7 which are convex upwardly in the drawing and are spaced apart from each other, thereby providing a dehumidifying material 5'. In FIGS. 1 and 2, the same reference numerals are used to designate similar parts.

The moisture absorbent 2 may be filled into every recess 7. Alternatively, with some of the recesses 7 being filled with the moisture absorbent while the remaining recesses are kept empty, the moisture-permeable film 4 may be securely attached to the packing material 1.

Figure 3:
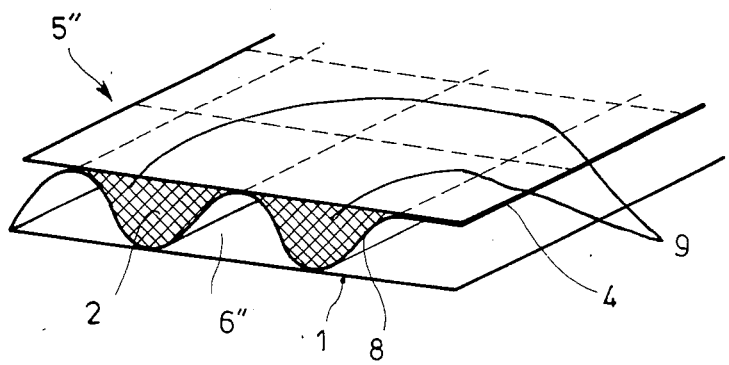
FIG. 3 is a broken perspective view of a third embodiment of the present invention.

FIG. 3 shows a third embodiment of the present invention which is also substantially similar in construction to the first embodiment described above. Intermediate partitions 8 made of the same material with the flexible material 1 and in the form of corrugation or groove are securely joined to one major surface of the flexible material 1. Each of recesses or valleys 9 defined by the intermediate partitions 8 provide partitioned chambers into which the moisture absorbent 2 is filled with the moisture-permeable film 4 being securely joined to the intermediate partitions 8, thereby sealing the moisture absorbent 2. Thus, a dehumidifying material 5'' is provided.

The dehumidifying materials 5' and 5'' of the second and third embodiments, respectively, can be used in a manner substantially similar to that of the dehumidifying material 5 described above with reference to FIG. 1. In the second embodiment, the recesses 7 and a space 6' therearound serve as an elastic layer or bed while in the third embodiment, spaces 6'' which are not filled with the moisture absorbent 2 serve as elastic layers or beds.

Figure 4:
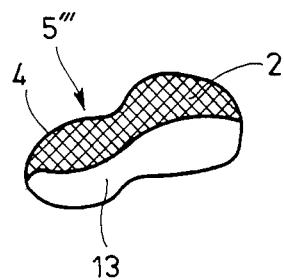
FIG. 4 is a perspective change of a fourth embodiment of the present invention.

FIG. 4 shows a fourth embodiment of the present invention. The moisture-permeable film is securely attached to each of small-sized elastic pieces 13 made of foamed plastic, rubber or the like with the moisture absorbent 2 being sealed between them, thereby providing a dehumidifying material 5''' in the form of packing.

According to the fourth embodiment, an article to be packed is placed into an outer box and the packing-shaped dehumidifying material 5''' are packed into the space defined between the outer box and the article packed therein, whereby any moisture in the outer box is absorbed through the moisture-permeable film 4 by the moisture absorbent 2. In like manner, moisture flowing from the surrounding atmosphere into the outer box can be absorbed. Furthermore, any impact exerted to the outer box from the exterior can be damped by the elastic packing pieces 13 of the dehumidifying materials 5'''. The inner box containing the packed article can be prevented from being damaged by the impact when the outer box is dropped.

Figure 5:
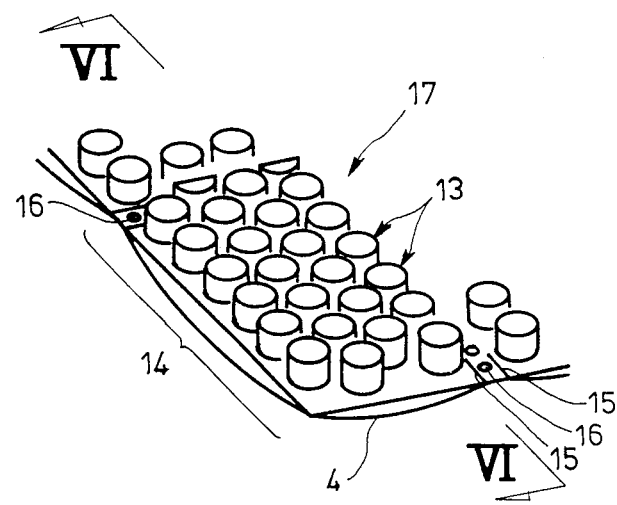
FIG. 5 is a broken perspective view of a fifth embodiment of the present invention.
Figure 6:
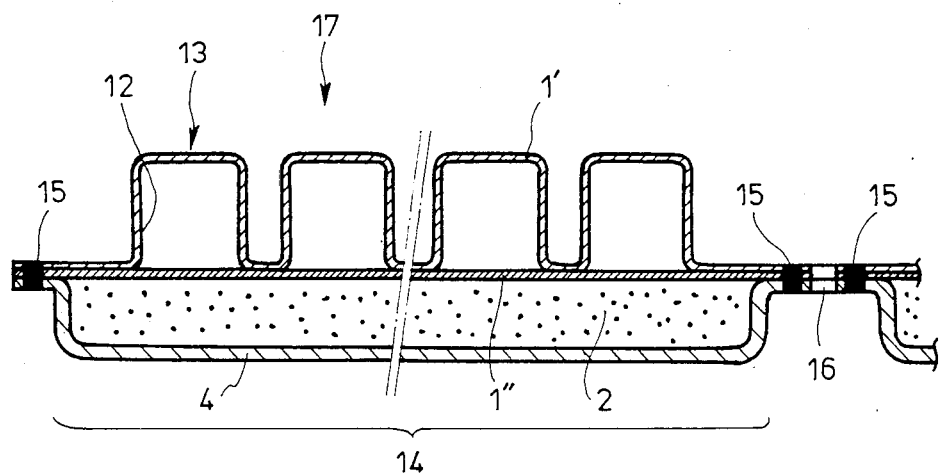
FIG. 6 is an enlarged vertical cross sectional view taken substantially along the line VI—VI of FIG. 5.

FIGS. 5 and 6 show a fifth embodiment of the present invention. A flexible material 1' is formed with a plurality of circular or rectangular recesses 12 which in turn are sealed by a flexible material 1'' so that a gas such as air is trapped into the recesses 12 and is sealed therein to define air tight caps 13. A suitable amount of moisture absorbent 2 is filled into each block 14 which is defined between the flexible material 1'' and the moisture-permeable film 4 and which has a predetermined volume. A plurality of air passages 16 are formed between sealing portions 15.

When the dehumidifying material 17 in accordance with the fifth embodiment of the present invention is cut to a size according to the size of a bed and is laid between the bed and a sheet, moisture coming out of a sleeping person thereon is absorbed through the moisture-permeable film 4 by the moisture absorbent 2. A plurality of air caps 13 serve as elastic layers or cushions so that the bed becomes very comfortable for sleeping. When the moisture-permeable film 4 is directed toward the sheet, the air passages 16 ar not necessarily needed; but when the moisture-permeable film 4 is directed toward the bed, moisture is absorbed through the air passages 16 by the rear surface.

Figure 7:
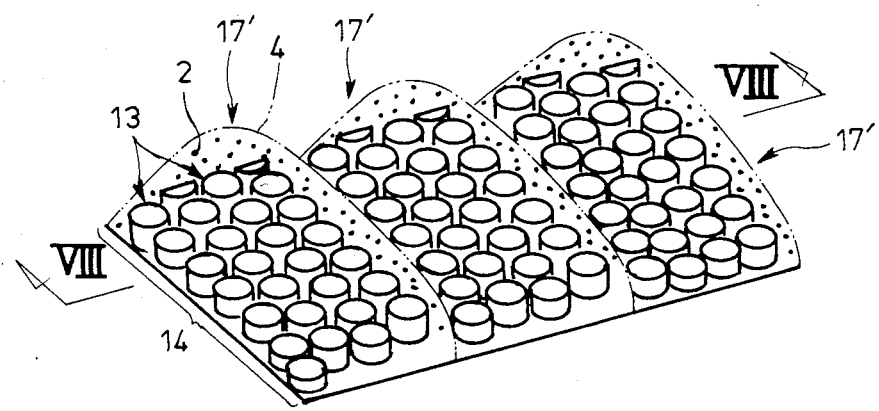
FIG. 7 is a broken perspective view of a sixth embodiment of the present invention.
Figure 8:
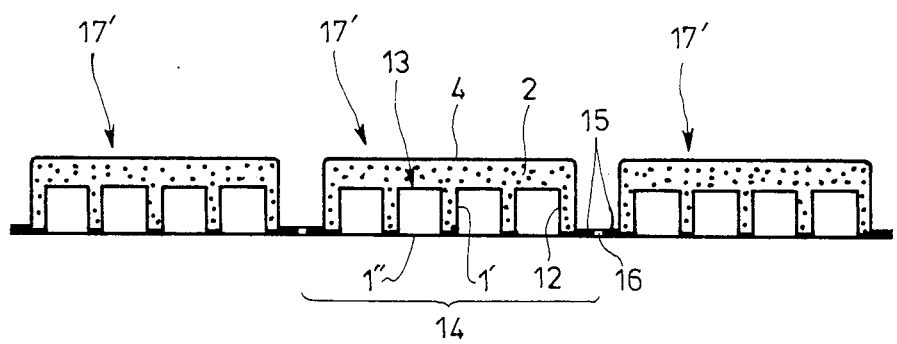
FIG. 8 is an enlarged vertical cross sectional view taken substantially along the line VIII—VIII of FIG. 7.

FIGS. 7 and 8 show a sixth embodiment of the present invention which is substantially similar in construction to the fifth embodiment described above with reference to FIGS. 5 and 6. The flexible material 1" is bonded to the flexible material 1' which is formed with a plurality of circular or rectangular recesses 12, whereby the air caps 13 are defined. The moisture-permeable film 4 is disposed to cover the air caps 13 and the moisture absorbent 2 is filled between the moisture-permeable film 4 and the flexible material 1'.

Reference numeral 15 represents a sealing portion; and 16, air passages.

When a dehumidifying material 17' in accordance with the sixth embodiment is used as liner for a cushion placed on a chair or for covers for seats in automotive vehicles, one may work or drive comfortably for a long period of time because of the moisture-absorbing effect of the liner or cover.

When any of the dehumidifying materials 5, 5', 5", 17 or 17' is attached to a wall surface of lockers, cabinets, closets and the like they provide dehumidifying panels having a high degree of moisture-absorbing effect.

In the embodiments described above, the amount of the moisture absorbent 2 may be suitably selected. The moisture absorbent 2 may be sealed together with a gas such as air for enhancement of the elasticity. Furthermore, depending upon uses or applications of the dehumidifying materials, those having the air passages at the sealing portions of the flexible material and permeable film and those having no air passages may be suitably selected.

The dehumidifying materials in accordance with the present invention as described above have the following various effects;

(I) The moisture-absorbent-receiving portions and the elastic layer or cushion are internally formed so that a packed article can be protected both from moisture and any impact exerted from the outside.

(II) Because it is not necessary to supply a dessicating agent separately, the problem of forgetting to supply the agent is completely eliminated. Furthermore, the three requirements of dehumidification, packing and impact resistance can be simultaneously satisfied so that the package can be compact in size.

(III) The dehumidifying materials can have any size and shape, such as sheets or separate pieces can be provided so that they can be conveniently used to pack both large and small-sized articles.

(IV) An article can be packed with either a sheet or a plurality of small-sized pieces so that moisture-absorbing area is large and a quick and strong dehumidifying effect can be attained.

(V) In addition to their use or application as packing materials, the dehumidifying materials of the present invention may be used on a bed so that moisture emanating from the surface of a sleeping person is absorbed, and comfortable sleeping is ensured.

(VI) When used as cushions or seat covers the material of the invention permits desk work or driving an automotive vehicle can be continued comfortably for a long period of time.

(VII) The material may be used for the efficient dehumidification of lockers, cabinets, closets, shoe boxes and the like.

(VIII) The dehumidifying materials in accordance with the present invention may be used in a wide variety of fields in which moisture may cause various adverse effects.

What is claimed is:

1. An elastic dehumidifying material comprising a flexible material which defines an elastic layer consisting of an air layer sealed air-tightly, a moisture-permeable and water-impervious film, and a moisture absorbent sealed between the flexible material and the film.

2. The dehumidifying material according to claim 1 wherein the flexible material is selected from the group consisting of plastic sheet, metal foil, water-proof paper, water-proof cloth and rubber sheet.

3. The dehumidifying material according to claim 1 wherein the moisture absorbent is selected from the group consisting calcium chloride, magnesium chloride, aluminum chloride, lithium chloride, calcium bromide, zinc chloride, phosphorus pentoxide, silica gel, activated alumina and calcium oxide.

4. The dehumidifying material according to claim 1 wherein the moisture absorbent comprises deliquescence inorganic salt and water-holding substance.

5. The dehumidifying material according to claim 1 wherein the moisture absorbent comprises deliquescence inorganic salt and hygroscopically hardenable substance.

6. The dehumidifying material according to claim 1 wherein the moisture absorbent comprises deliquescence inorganic salt, water-holding substance and hygroscopically hardenable substance.

7. The dehumidifying material according to claim 1 wherein the elastic layer is defined between moisture-absorbent-receiving zones.

8. The dehumidifying material according to claim 1 wherein the elastic layer is defined on a surface of the flexible material away from moisture-absorbent-receiving zones.

9. The dehumidifying material according to claim 1 wherein the elastic layer is defined in moisture-absorbent-receiving zones.

10. The dehumidifying material according to claim 1 wherein the elastic layer is an air layer.

11. The dehumidifying material according to claim 1 used in packaging.

12. The dehumidifying material according to claim 1 used in bedding.

13. The dehumidifying material according to claim 1 used for panels.

14. An elastic dehumidifying material comprising at least three sheets, the first and second sheets being flexible and air-tightly sealed to each other with air therebetween to define an elastic layer of said dehumidifying material, the third sheet being a moisture-permeable and water-impervious film, and a moisture absorbent sealed between the second and third sheets.

* * * * *